United States Patent [19]
Kobiella

[11] Patent Number: 5,306,383
[45] Date of Patent: Apr. 26, 1994

[54] METHOD AND APPARATUS FOR PRODUCING A WELDED JOINT IN THERMOPLASTIC STRAP WITH DIFFERENTIAL PRESSURE

[75] Inventor: Robert J. Kobiella, Rolling Meadows, Ill.

[73] Assignee: Signode Corporation, Glenview, Ill.

[21] Appl. No.: 969,584

[22] Filed: Oct. 30, 1992

[51] Int. Cl.$^5$ .............................................. B29C 65/06
[52] U.S. Cl. ..................................... 156/468; 156/73.5; 156/73.6; 156/157; 156/475; 156/502; 156/580
[58] Field of Search ................... 156/73.5, 73.6, 157, 156/468, 469, 580, 580.1, 580.2, 583.1, 502, 475

[56] References Cited

U.S. PATENT DOCUMENTS

| | | | |
|---|---|---|---|
| 3,062,695 | 11/1962 | Hull | 156/73 |
| 3,554,845 | 1/1971 | Billett et al. | 156/580 |
| 3,554,846 | 1/1971 | Billett | 156/580 |
| 4,119,449 | 10/1978 | Gould et al. | 156/468 |
| 4,227,949 | 10/1980 | Wehr | 156/73.5 |
| 4,247,346 | 1/1981 | Maehara et al. | 156/73.5 |
| 4,378,262 | 3/1983 | Annis | 156/73.5 |
| 4,462,849 | 1/1984 | MacLaughlin et al. | 156/73.5 |
| 4,707,390 | 11/1987 | Cheung | 428/57 |
| 4,776,905 | 10/1988 | Cheung et al. | 156/73.5 |
| 4,892,768 | 1/1990 | Cheung et al. | 428/57 |

FOREIGN PATENT DOCUMENTS

3214425 9/1988 Japan .................................. 156/73.5

*Primary Examiner*—Caleb Weston
*Attorney, Agent, or Firm*—Schwartz & Weinrieb

[57] ABSTRACT

A novel method and apparatus are provided for making an improved welded joint between overlapping lengths of thermoplastic strap. The welded joint includes a central region and an adjacent peripheral region. The pressure on the strap joint during formation is released first in the peripheral region and subsequently in the central region. An embodiment of the apparatus for making such a joint includes an anvil, a central strap-engaging member, a peripheral strap engaging member, and a mechanism for moving the anvil sequentially to three positions. At a first position the overlapping strap lengths are pressed between the anvil and both the central and peripheral strap-engaging members. In the second position of the anvil the peripheral strap-engaging member does not press against the strap lengths while the central strap-engaging member continues to press the strap lengths against the anvil. In the third position of the anvil the anvil and strap-engaging members are sufficiently spaced apart to release all of the pressure on the strap lengths.

11 Claims, 6 Drawing Sheets

METHOD AND APPARATUS FOR PRODUCING A WELDED JOINT IN THERMOPLASTIC STRAP WITH DIFFERENTIAL PRESSURE

TECHNICAL FIELD

This invention relates to welds for securing together overlapping portions of thermoplastic strapping and also relates to a method and apparatus for producing such welds.

BACKGROUND OF THE INVENTION AND TECHNICAL PROBLEMS POSED BY THE PRIOR ART

A variety of processes have been marketed and/or proposed over the years for welding or bonding together overlapping portions of a tensioned loop of thermoplastic strap encircling an article. In the context of this subject matter, the terms "joint," "weld," and "welded joint" are conventionally used interchangeably to designate the bonded or joined-together portions of the strap.

In one such process, a hot blade is employed to melt the interface portions of the overlapping strap lengths which then resolidify to form the weld. However, this process typically generates vapor and smoke which may be objectionable. Thus, it would be desirable to provide an improved process wherein smoke generation is eliminated or substantially reduced.

Another process is effected by first pressing the overlapping strap portions together and then creating a unidirectional or multidirectional bodily sliding frictional movement between the contacting surfaces of the overlapping strap portions so as to melt the interface region of the overlapping strap portions. The melted interface region is allowed to solidify at rest, either under pressure or free of pressure, so as to bond the overlapping strap portions together.

This process, which can be generally designated as "friction-fusion welding" or "friction welding", has proven to be especially effective with conventional thermoplastic strap materials such as nylon, polyester, and polypropylene. Such conventional strap is typically provided commercially in widths ranging from about 5 mm. to about 13 mm. and in thicknesses ranging between about 0.25 mm. and about 0.89 mm. Some systems for making a friction-fusion weld between portions of such strap employ high-speed, reciprocating mechanisms, and these can produce considerable noise during operation. It would be desirable to provide an improved system which would produce an effective friction-fusion weld with substantially less noise.

Welded joints in thermoplastic strap have found wide commercial acceptance in many applications. However, a welded joint is typically the weakest part of a tensioned strap loop secured about a package or other object. Attempts have been made to produce stronger welds.

A unique strap joint or weld having greater strength, and methods for producing such welds, are disclosed in U.S. Pat. Nos. 4,707,390 and 4,776,905. The weld is formed by first fusing (melting or liquefying under the application of heat) at least part of the thickness of each strap portion across the width of the interface. The fused parts of the strap portions are then permitted to subsequently solidify to form the welded joint. The weld is created with a selected strap material in a manner such that cavities (such as voids, bubbles, or discreet volumes of a separate material) are encapsulated within the resolidified region of the weld. The cavities have been found to result in the weld having a greater strength as discussed hereinafter.

The cavities are dispersed generally across the width of the strap weld and are preferably more generally concentrated toward each longitudinal end of the weld. In the preferred form of the weld, the concentration of cavities in the weld middle portion is substantially less than at the weld ends.

In one form of the method for producing the improved joint of the invention, the cavities are believed to result from the production of gaseous bubbles during the welding process. It is believed that some types of strap contain significant amounts of an additional material, such as moisture, which can exist as a gas when the strap portions are melted under pressure. For example, polyester and polyamide nylon strap are hygroscopic and can contain some amount of water.

It is theorized in U.S. Pat. No. 4,707,390 that when portions of such strap are melted and are under pressure during welding, the generated gas bubbles tend to be forced outwardly toward the edges and ends of the weld. If the welding pressure is terminated while the strap portions are still molten and before all of the bubbles have been squeezed out of the weld area, the remaining bubbles become encapsulated within the solidifying strap material to form the cavities.

The cavities may be defined by other structures and materials which are provided as part of the strap structure as disclosed in the U.S. Pat. No. 4,892,768. In particular, the strap can include (1) at least a first layer of a first material that does not produce the desired cavities, and (2) a second material for effecting the creation of the plurality of discreet volumes in the resolidified region as a result of application of heat and subsequent resolidification.

In one embodiment, the second material is present on at least one side surface of the first material layer, and the second material defines a second layer carried on the first material layer. An example of the first material is polypropylene or polyethylene terephthalate. An example of the second material is polyethylene terephthalate having an intrinsic viscosity of about 1.0.

In another embodiment, the second material is dispersed as an additive in the first material layer and has a greater concentration at least at one side surface of the first material layer. The additive second material may be a foaming agent material such as a 5-phenyltetrazole compound or a toluenesulfonyl semicarbicide compound.

In another embodiment, the second material may disperse to form separate globules which occupy the discreet volumes. Such a second material may be the combination of polyisobutylene dispersed in a layer of polypropylene which in turn is carried on the first material layer.

With appropriate welding techniques, the above-described strap compositions can produce welded joints with cavities distributed in the weld, including in the outer or end portions of the weld. The above-referenced U.S. Pat. Nos. 4,707,390 and 4,892,768 each disclose that the exact mechanism by which the cavities increase the weld strength is not necessarily fully or accurately understood, but nevertheless propose a theory. In particular, it is believed that the improved joint strength of the weld results from the redistribution of stresses within the weld, and that the cavities cause the stress redistribution. It is believed that welds tend to fail when cracks form at the ends of the weld. The cavities are believed to reduce the stresses at a crack tip that is propagating into one or more of the cavities.

While the above-described type of cavity-containing weld provides increased strength and functions well in a variety of applications, there is a continuing need for a system that can produce high quality welds routinely and consistently, and in an economic manner.

In particular, it has been found in some applications that, depending on the strap material, strap size, and welding parameters, the capability for repeatedly producing acceptable welds having a desired high strength is not as good as would be desired. It has been theorized that in some such cases, the cavities may not be distributed in a manner that provides the desired level of increased joint strength. For example, there may be too many cavities in the central portion of the weld. The central portion of the weld may then have an excessively "foamed" structure while the peripheral region of the weld has too few cavities. It is suspected that, in some situations, this might actually decrease the strength of the weld. Accordingly, it would be desirable to provide a system for better controlling the creation and distribution of cavities in the weld.

The present invention provides an improved welded joint between overlapping strap lengths and also provides an apparatus and method which can accommodate designs having the above-discussed benefits and features.

SUMMARY OF THE INVENTION

Although the novel method and apparatus of the present invention may be advantageously employed with certain types of strap to produce a welded joint continuing encapsulated cavities, it will be appreciated that the novel method and apparatus may be employed with other types of strap for forming welded joints which do not contain encapsulated cavities.

According to one aspect of the present invention, an improved welded joint is provided between two overlapping lengths of thermoplastic strap which are arranged in a face-to-face relationship at the welded joint. At least part of the thickness of each strap length is resolidified from a fused state subjected to above-ambient pressure. The resolidified thickness part of one of the strap lengths is merged with the resolidified thickness part of the other strap length to define a continuous resolidified region. The resolidified region includes a peripheral region and an adjacent central region in which the above-ambient pressure was maintained during the fused state longer than in the peripheral region.

The welded joint may be also characterized as incorporating a resolidified thickness of part of one strap length being merged with a resolidified thickness of the other strap length to define a continuous resolidified region wherein the overlapping lengths of strap in the fused state were subjected to above-ambient pressure in a central region and in an adjacent peripheral region, but with the above-ambient pressure being relieved first in the peripheral region and subsequently in the central region.

A further aspect of the invention includes a method for making the welded joint. The method includes the step of forcing the strap lengths into face-to-face contact at above-ambient pressure along an interface in a central region and in an adjacent peripheral region.

The temperature of the strap lengths is increased along the interface sufficiently to melt at least part of the thickness of each strap portion at the interface.

The above-ambient pressure is released first in the peripheral region and subsequently in the central region whereby the melted parts of the strap lengths along the interface solidify to form the welded joint.

According to a still further aspect of the invention, a novel apparatus is provided for making the welded joint between the first and second overlapping lengths of flexible, thermoplastic strap. The apparatus may be generally characterized as including three systems. First, the apparatus includes pressing means for forcing the strap lengths into face-to-face contact at above-ambient pressure along an interface in a central region and in an adjacent peripheral region. Second, the apparatus includes means for increasing the temperature of the strap lengths along the interface sufficiently to melt at least part of the thickness of each strap portion at the interface. Finally, there is a means for releasing the above-ambient pressure first in the peripheral region and subsequently in the central region. The apparatus permits the melted parts of the strap lengths along the interface to cool so as to solidify and form the welded joint.

A preferred embodiment of the apparatus includes an anvil for engaging the first overlapping length of strap. The apparatus further includes a central strap-engaging member for engaging the second overlapping length of strap. A peripheral strap-engaging member is provided for engaging the second overlapping length of strap around the central strap-engaging member.

The apparatus employs pressing means for effecting relative movement between the anvil on the one hand and each of the strap-engaging members on the other hand so as to establish a number of positions:

(1) a first position in which the anvil engages the first overlapping length of strap while both the central and peripheral strap-engaging members engage the second overlapping lengths of strap to force the lengths of strap into face-to-face contact under pressure, (2) a second position in which the anvil and the peripheral strap-engaging member are sufficiently spaced apart to release the pressure of the peripheral strap-engaging member on the lengths of strap while still maintaining the pressure of the central strap engaging member on the lengths of strap, and (3) a third position in which the anvil and the central strap-engaging member are sufficiently spaced apart to release the pressure of the central strap-engaging member on the lengths of strap.

Finally, the apparatus includes means for increasing the temperature of the contacting faces of the strap lengths to melt at least a part of the thickness of each strap length.

It has been found that the above-described apparatus and method for forming the welded joint can produce a welded joint as hereinbefore described. With certain strap materials, the peripheral region of the welded joint contains a distribution of cavities while the joint central region is substantially free of such cavities. Such a joint structure has been found to have increased strength and increased resistance to crack propagation.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is an enlarged, fragmentary, perspective view, of a welded joint between two overlapping lengths of transparent, thermoplastic strap arranged in a face-to-face relationship, and FIG. 1 shows features of the welded joint in an exaggerated size and relationship so that certain details may be more clearly viewed;

DESCRIPTION OF THE PREFERRED EMBODIMENT

While this invention is susceptible of embodiment in many different forms, this specification and the accompanying drawings disclose only one specific welded joint, one basic method for making the joint, and a preferred embodiment of the apparatus for effecting the method. These are presented as examples of the invention. The invention is not intended to be limited to the examples so described, however. The scope of the invention is pointed out in the appended claims.

For ease of description, the apparatus of this invention is described in a normal (upright) operating position, and terms such as upper, lower, horizontal, etc., are used with reference to this position. It will be understood, however, that the apparatus of this invention may be manufactured, stored, transported, used, and sold in an orientation other than the position described.

Some of the figures illustrating an embodiment of the apparatus show structural details and mechanical elements that will be recognized by one skilled in the art. However, the detailed descriptions of such elements are not necessary to an understanding of the invention, and accordingly, are not herein presented.

The apparatus of the present invention may be characterized as an assembly for incorporation in a tool or machine for effecting a friction-fusion weld of overlapping lengths of thermoplastic strap. Such strapping machines or tools can employ certain conventional components the details of which, although not fully illustrated or described, will be apparent to those having skill in the art and an understanding of the necessary functions of such components.

Figure 1:
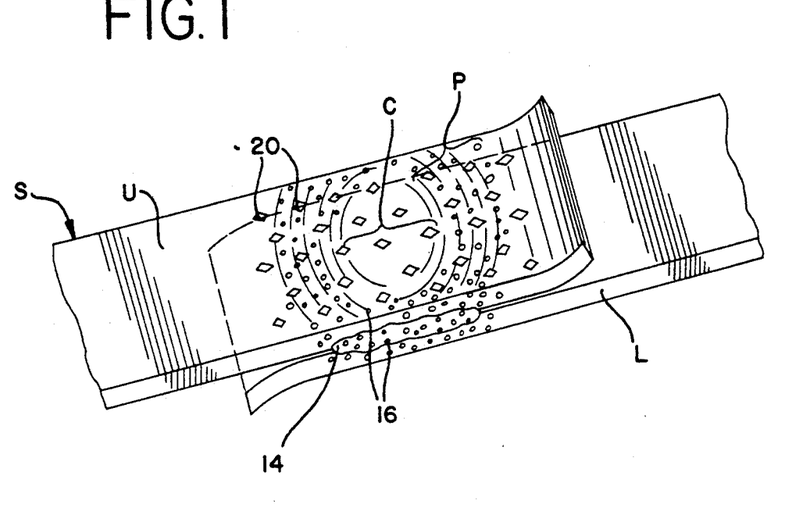
Figure 2:
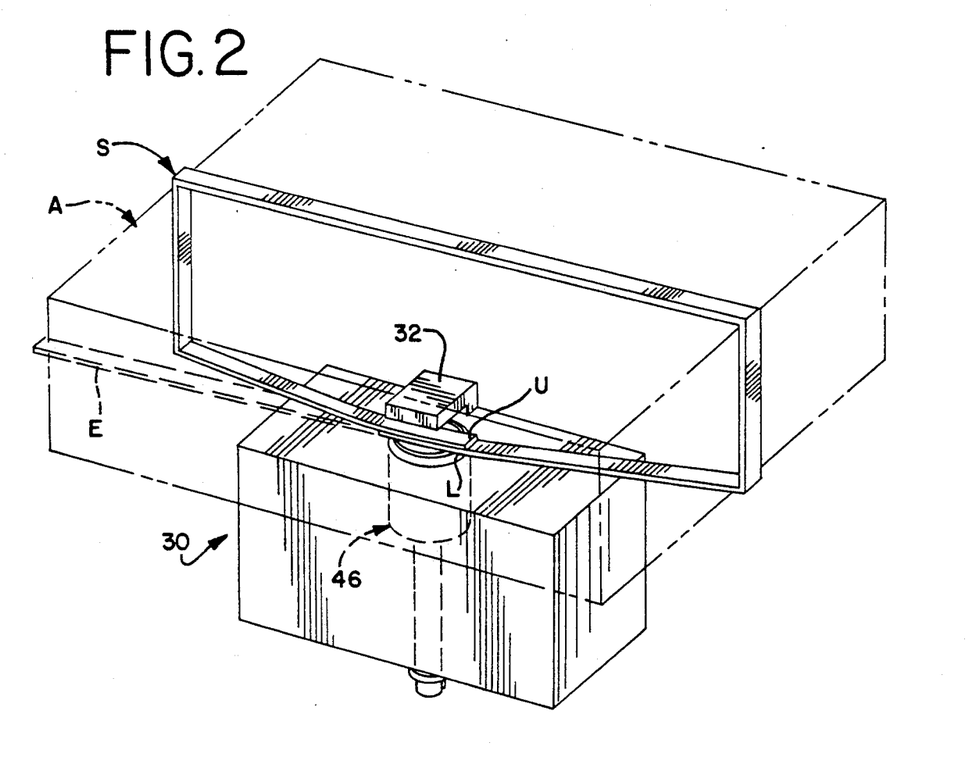
FIG. 2 is a simplified, substantially diagrammatic, perspective view of one form of an apparatus which is capable of producing an improved thermoplastic strap welded joint, such as is illustrated in FIG. 1, the apparatus being shown in an initial rest mode for accommodating the positioning of a strap loop around an article (shown in phantom by dashed lines) so that the overlapping lengths of strap can be subsequently joined together with a friction-fusion welded joint.

An embodiment of the welded joint of the present invention is illustrated generally in FIG. 1. The joint is formed in overlapping portions of a strap S. Typically, the strap S may be provided in the form of a length of strap for being disposed in a loop around an article A (FIG. 2). The strap S has the flexibility, strength, abrasion resistance, and compositional stability, among other characteristics, that would be suitable for use as strap in the particular application for which it is intended.

Conventional thermoplastic straps include nylon, polypropylene, and polyethylene terephthalate. Straps formed from such materials may be fabricated by generally similar techniques, as is disclosed, for example, in U.S. Pat. No. 3,394,045 relating to polypropylene strapping.

Conventional strapping materials are commercially available from various entities around the world, including in the United States of America. For example, polyethylene terephthalate strap is sold in the United States of America under the product designation "Tenax B" strap by Signode Corporation, 3600 West Lake Avenue, Glenview, Ill. 60025, U.S.A. This is one type of strap that may be employed where it is desired to produce an improved welded joint having encapsulated cavities which increase the joint strength. "Tenax B" strap has an intrinsic viscosity of about 0.95. Improved welds have also been produced in polyethylene terephthalate strap which has an intrinsic viscosity of about 0.62 and which is sold by Signode Corporation under the product designation "Tenax A" strap. These materials have the capability of being provided with varying degrees of uniaxial orientation sufficient to provide the strengths desired for a variety of specific conventional strapping applications.

The welded joint shown in FIG. 1 has been illustrated as being formed in the strap S of the Tenax B brand material described above. The strap S includes a first, or upper, strap length U and a second, or lower, strap length L. The strap lengths U and L are positioned in an overlapping relationship along or in an elongate strap-receiving path. A part of the thickness of each strap portion U and L forms a resolidified region 14 which constitutes the weld. The part of the thickness of each strap portion that forms the weld is resolidified from a fused state. The resolidified thickness part of the upper strap length U is merged with the resolidified thickness part of the lower strap length L.

The weld includes a central region C which, in the embodiment illustrated in FIG. 1 has a generally circular configuration. A peripheral region P is located beyond the central region C. In the preferred embodiment of the welded joint illustrated in FIG. 1, the peripheral region P encircles the central region C. The peripheral region P has a generally annular configuration except that the portions of the peripheral region P are "cut off" at the lateral side edges of the strap S. However, if a wider strap S were employed, a peripheral region P having a generally full, annular configuration would be accommodated.

The peripheral region P contains a plurality of cavities 16 (such as voids, bubbles, or discreet volumes of a separate material) which are encapsulated within the peripheral portion of the resolidified region 14. On the other hand, the central region C is substantially free of such cavities 16. As will be explained hereinafter, a novel method for producing the welded joint illustrated in FIG. 1 results in substantially all of the cavities 16 being distributed in the peripheral region P with substantially no cavities 16 existing in the central region C.

As explained above, it is believed that the improved joint strength of the weld results from the redistribution stresses within the weld, and that the cavities cause the stress redistribution. It is believed that the cavities reduce the stresses at a crack tip that may begin propagating into one or more of the cavities. The exact mechanism by which the cavities 16 function to increase the joint strength is not necessarily fully understood, and there is no intent herein to be bound by any theory or by any explanation as provided above. The number, size, and distribution of the cavities 16 within the peripheral region P in a particular weld can vary and may depend, to some extent, on the width and thickness of the strap and weld, as well as upon the particular composition of the strap S and specific weld techniques employed.

The nominal thickness of each strap length U and L may be, for example, about 0.5 mm., and the width of each strap length U and L may be about 11 mm. The length of the completed weld, along the length of the strap S, may be about 17 mm. The thickness of the welded joint, i.e., the thickness of the resolidified region 14, would typically be about 0.1 mm. for this type and size of strap S. These dimensions would, of course, vary depending upon the size of the strap employed and upon the method and apparatus employed for creating the welded joint.

For the typical strap S and weld illustrated in FIG. 1, the cavities 16 generally each have a volumetric configuration that is irregular and not perfectly spherical. The cavities 16 typically do not all have the same size. For example, a substantial number of the cavities may have a major dimension falling in the range of about 25% to about 50% of the thickness of the resolidified region 14. However, the size distribution of the cavities 16 is, of course, dependent upon the strap material, strap dimensions, and specific method employed for creating the welded joint.

When the welded joint is produced with the preferred embodiment of the apparatus described hereinafter, the upper strap length U is engaged by the apparatus in a way that creates a pattern of gripping marks or indentations 20 in the upper surface of the strap length U. These indentations 20 are not part of the welded joint per se, and the presence or absence of such indentations, or the shape and arrangement of such indentations, is dependent upon the manner in which the welded joint is made.

The welded joint illustrated in FIG. 1 may be made by the apparatus 30 illustrated in FIGS. 2-11. The apparatus 30 is shown in FIG. 2 in a configuration that the apparatus would have in a strapping machine on which, or in which, an article A would be positioned. For ease of illustration, the other components of a conventional strapping machine have been omitted.

The apparatus 30 includes an anvil 32 for engaging the first overlapping length of strap U. The anvil 32, in the preferred embodiment illustrated, is located at the top of the apparatus 30 and maintained there by the frame of the machine (not illustrated). Preferably, the lower surface of the anvil 32 has serrations or teeth 34 (FIG. 4) for firmly engaging the upper strap length U. The top surface of the anvil may be smooth.

Typically, the article A is placed on the top of the anvil 32 and surrounding portions of the machine so that the strap S can be looped around the article A as illustrated in FIG. 2. A portion of the upper strap length U can be gripped (by conventional means not illustrated) so that the machine can pull the lower strap length L to tension the strap loop tightly about the article A. The tensioning means may include any suitable special or conventional mechanism (not illustrated), and such a mechanism forms no part of the present invention. After the loop has been tensioned, the overlapping strap lengths U and L are joined together by a friction-fusion weld produced by the apparatus 30 as explained in detail hereinafter.

Figure 4:
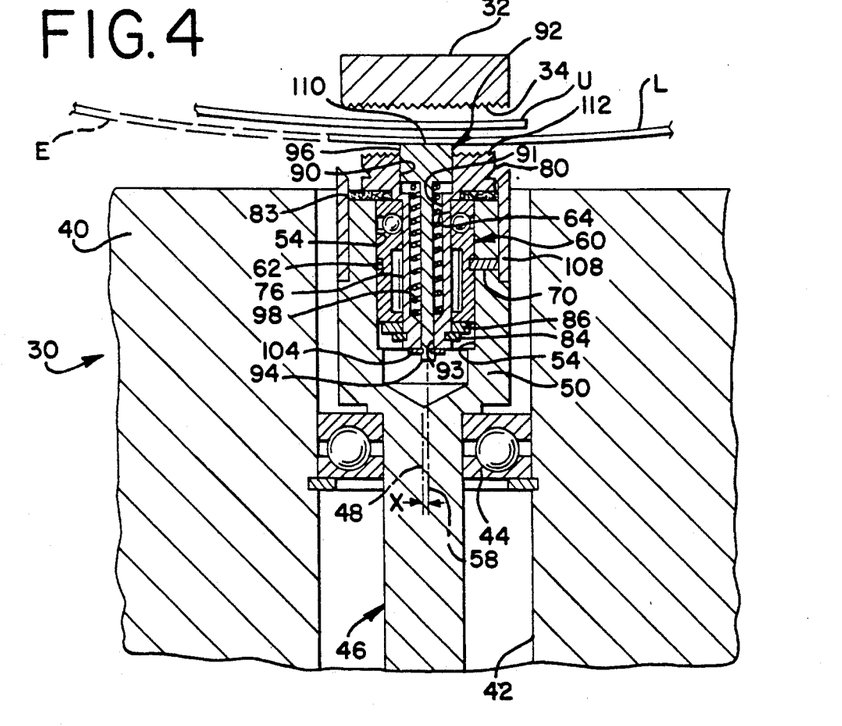
FIG. 4 is a fragmentary, cross-sectional view taken generally along the plane 4—4 in FIG. 3.

When the strap S is initially encircled about the article A, the overlapping strap lengths U and L may be initially relatively loosely disposed beneath the anvil 32 as shown in FIG. 4, but the upper strap length U and lower strap length L may be suitably gripped by special or conventional means on the machine (not illustrated) to maintain the strap loop under tension on either side of the anvil 32.

In one conventional system typically employed in strapping machines, the strap S is drawn from a supply reel (not illustrated) so that initially a trailing portion E of the lower strap length L extends from the region of strap overlap through a tensioning mechanism (not illustrated) and to the supply reel. The tensioning mechanism may be operated to maintain the loop tension in conjunction with a suitable gripping system for holding the upper strap length U in place.

Figure 6:
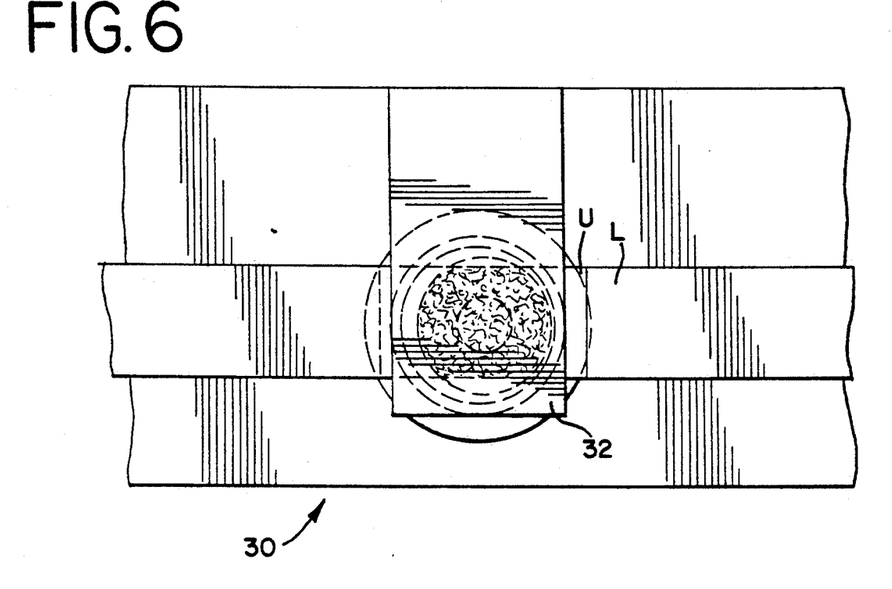
FIGS. 6, 8, and 10 are each views similar to FIG. 3 but showing the sequence of operation of the apparatus.

The anvil 32 is movable vertically by suitable positioning means or pressing means schematically illustrated by the double headed arrow 33 in FIG. 2. Depending upon the particular step in the operation of the apparatus, the anvil 32 may be maintained at a first or lowest elevation (FIGS. 6 and 7), a second or intermediate position (FIGS. 8 and 9), and a third or highest position (FIGS. 3, 4, 10, and 11). The vertical movement of the anvil 32 may be effected by any suitable special or conventional mechanism (not illustrated), and the details of the design and operation of such a mechanism form no part of the present invention.

The anvil 32 may also be movable in the plane parallel to the bottom of the article A. In particular, the anvil 32 is preferably movable (perpendicular to the plane of FIG. 4) between an extended position illustrated in solid lines in FIGS. 2 and 3 and a retracted position shown in phantom by dashed lines 36 in FIG. 3. In the extended position, the anvil 32 overlies the overlapping strap lengths U and L, and in the retracted position, the anvil 32 is spaced away from the overlapping strap lengths U and L. The anvil 32 is typically retracted after the welded joint has been made in the strap loop so that the strapped article A is can be easily removed from the strapping machine. The anvil 32 may be extended and retracted by suitable special or conventional mechanisms (not illustrated), the details of which form no part of the present invention.

The apparatus 30 includes a supporting frame 40 below the anvil 32. The frame 40 defines a cylindrical cavity 42. The frame also includes a bearing 44 mounted within the cavity 42.

A drive shaft 46 is adapted to be mounted on the bearing 44 within the cavity 42 for rotation about a vertical axis 48. The drive shaft 46 has an enlarged upper portion 50 defining a cavity 54. The cavity 54 is a cylindrical drive cavity having a rotational axis 58 which is parallel to, but offset by a distance X radially from, the drive shaft axis 48. The lower end of the drive shaft 46 has an appropriate configuration (FIG. 5) for being engaged with a suitable rotating means, such as an electric motor drive system (not illustrated). The drive shaft 46 can thus be rotated about the longitudinal axis 48.

Before the drive shaft 46 is mounted in the frame cavity 42 on the bearing 44 and connected to the drive system, various internal components are assembled in the drive shaft cavity 54. Specifically, one component to be disposed in the cavity 54 is a combination roller ball thrust bearing and needle bearing unit 60. The unit 60 may be a suitable special or conventional device that defines a central, cylindrical bore 64 (FIG. 4). The device 60 may also include a peripheral retaining groove 62. One side of the drive shaft upper portion 50 defines a slot 68 (FIG. 5) for receiving a C-shaped keeper clip 70. When the bearing unit 60 is disposed within the drive shaft cavity 54, the keeper clip 70 can be inserted into the drive shaft slot 68 to engage a portion of the groove 62 of the bearing unit 60 to retain the bearing unit 60 in position.

Figure 5:
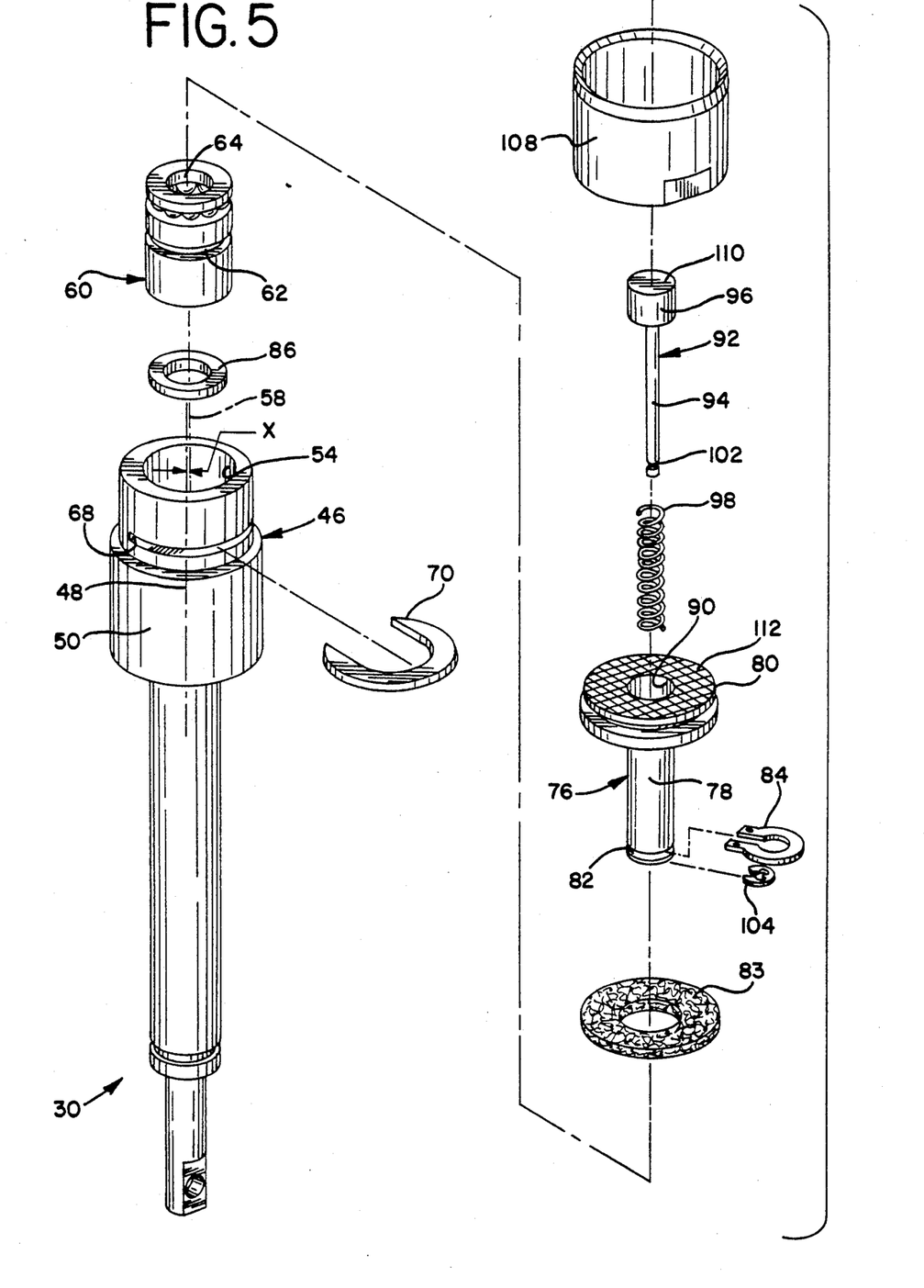
FIG. 5 is a simplified, exploded, perspective view of the internal components of the apparatus.

Before the bearing unit 60 is disposed in the drive shaft 46, a number of other components are mounted in the bearing unit 60. In particular, as shown in FIG. 5, the bearing unit bore 64 receives a vibrator unit 76 which includes a shaft 78 and an enlarged disk-shaped, peripheral strap-engaging member 80. The shaft 78 is adapted to be received within the bore 64 of the bearing unit 60. A felt ring 83 is preferably provided for being disposed on the vibrator unit shaft 78 below the peripheral strap-engaging member 80 before the vibrator unit 76 is mounted in the bearing unit 60.

The bottom of the shaft 78 defines a groove 82 for receiving a large snap ring 84. Before the snap ring 84 is installed, but after the vibrator unit 76 has been mounted within the bearing 60, a thrust washer 86 is disposed on the shaft 78 below the bearing unit 60. The snap ring 84 is then installed on the shaft 78 to retain the thrust washer 86 in place.

The strap-engaging member 80 of vibrator unit 76 defines an annular strap-engaging surface 112 around a central bore 90. The bore 90 has a reduced diameter intermediate portion 91 (FIG. 4) and a further reduced diameter lower portion 93 (FIG. 4) for receiving a plunger 92. The plunger 92 includes a shaft 94 and an enlarged, central strap-engaging member 96. A helical, compression spring 98 is disposed around the plunger shaft 94, and the plunger 92 and spring 98 are inserted into the bores 90, 91, and 93 of the vibrator unit 76 as shown in FIG. 4.

The bottom end of the plunger shaft 94 projects below the bottom end of the vibrator unit 76. Near the bottom end of the plunger shaft 94 there is a groove 102 (FIG. 5) for receiving a snap ring 104. The snap ring 104 bears against the bottom end of the vibrator unit shaft 78 (FIG. 4) and retains the plunger 92 within the vibrator unit 76.

After the plunger 92, spring 98, vibrator unit 76, thrust washer 86, and snap rings 84 and 104 are properly assembled, the assembly is disposed within the offset bore 54 in the drive shaft 46. The keeper clip 70 is then inserted into the drive shaft slot 68 to retain the bearing unit 60 in position within the drive shaft 46.

Finally, an annular retention ring 108 is provided for being disposed on the top portion of the drive shaft 46 to maintain the keeper clip 70 in the slot 68. The upper edge of the ring 108 projects along side the peripheral strap-engaging member 80 but does not project beyond the strap-engaging surface 112.

After the components are assembled in the drive shaft 46, the drive shaft 46 can be mounted within the frame 40 and connected with the drive means (not illustrated).

Figure 3:
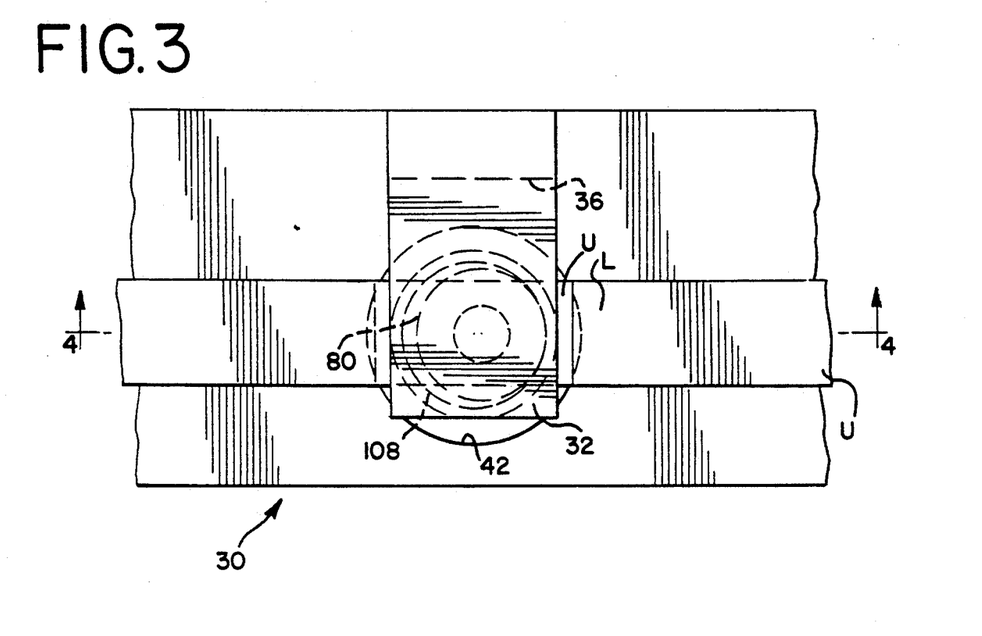
FIG. 3 is a fragmentary, greatly enlarged, plan view of the apparatus.

In the assembled, rest position illustrated in FIGS. 3 and 4, the spring 98 biases the plunger 92 to the uppermost position as determined by the engagement of the snap ring 104 with the bottom of the vibrator unit 76 (FIG. 4). The top of the plunger strap-engaging member 96 projects upwardly above the top of the vibrator member strap-engaging member 80. The top of the plunger strap-engaging member 96 will thus engage the lower strap length L first, and will hold the strap length L off of the peripheral strap-engaging member 80 unless and until the plunger 92 is forced downwardly a sufficient amount.

In the preferred embodiment illustrated, the central strap-engaging member 96 of the plunger 92 has a generally smooth top surface 110. However, the peripheral strap-engaging top surface 112 of the vibrator unit 76 is preferably toothed for gripping the lower overlapping strap L. In the presently contemplated preferred embodiment, the teeth are defined on the annular surface 112 in a substantially regular array, and the teeth are aligned in orthogonal rows. Each tooth has four exterior sides which converge inwardly to a point, and each side is inclined at an angle of about 60°. Each tooth has a height of about 0.35 mm. Adjacent teeth in each row are spaced apart such that the tip-to-tip spacing is about 0.75 mm. and the base-to-base spacing is about 0.35 mm. The configuration and pattern of the teeth 34 on the anvil 32 may be the same or similar. Alternatively, other suitable tooth configurations and patterns may be employed.

Figure 7:
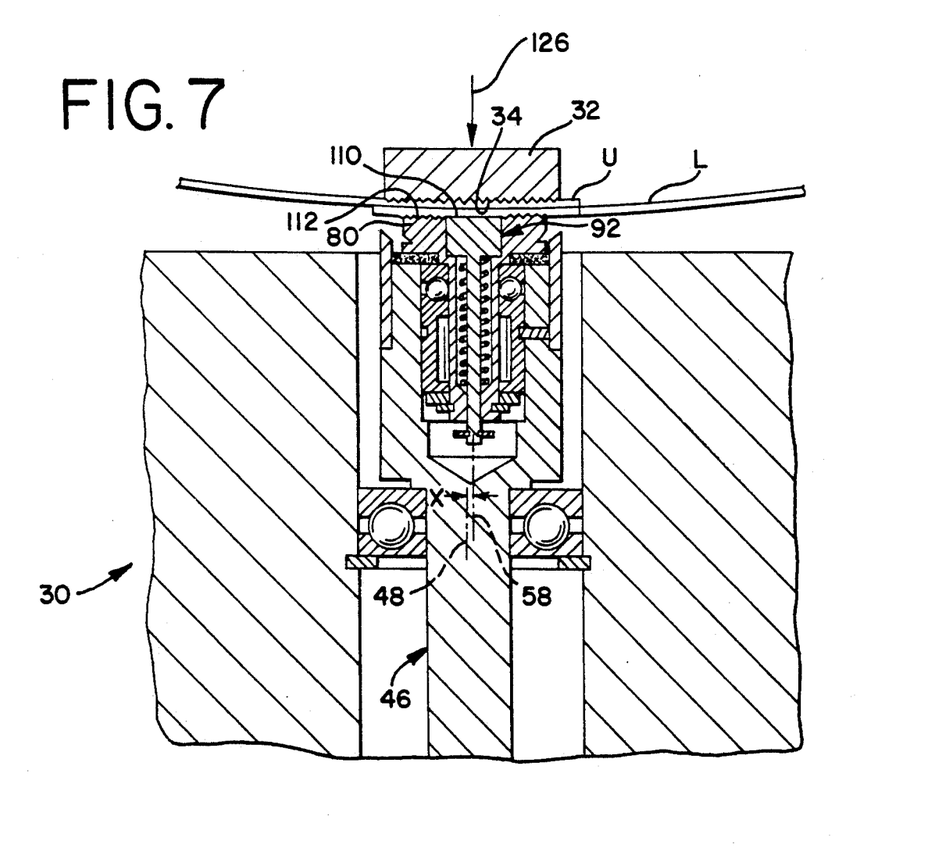
FIGS. 7, 9, and 11 are each views similar to FIG. 4 and correspond to the operation sequence shown in FIGS. 6, 8, and 10, respectively.
Figure 8:
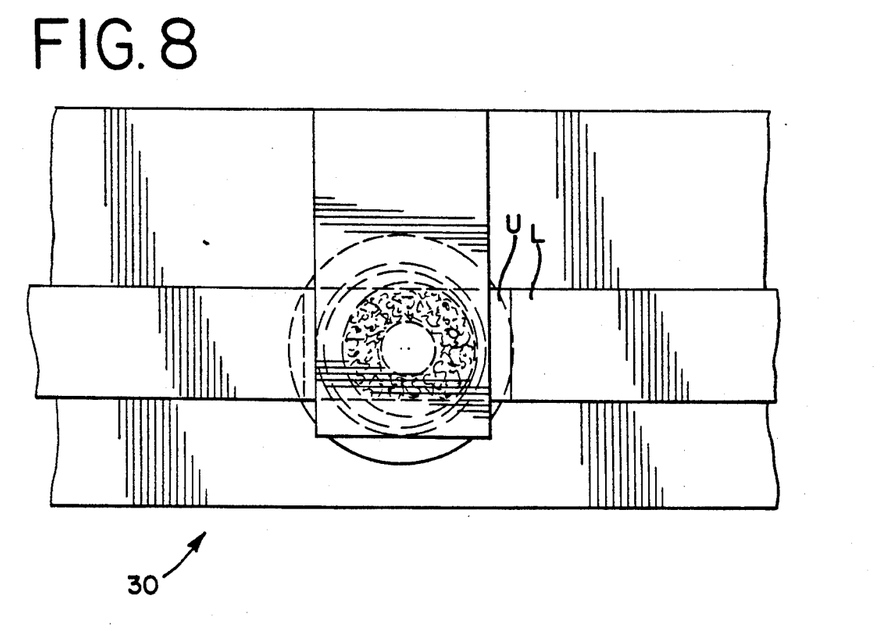

The apparatus 30 can be conveniently operated in an efficient manner to produce the friction-fusion weld at a reduced noise level and with little or no generation of smoke. In particular, the anvil 32 is initially moved from the fully elevated position shown in FIGS. 3 and 4 to the fully lowered position shown in FIGS. 6 and 7. As illustrated in FIG. 7, the anvil 32 is moved downwardly in the direction of the arrow 126 toward the upwardly facing strap-contacting surface 110 of the plunger 92.

In the fully lowered position, the anvil 32 engages the first overlapping length of strap U and forces it downwardly against the lower strap length L so that the bottom surface of the lower strap length L engages the plunger strap-contacting surface 110. Continued downward movement of the anvil 126 forces the plunger 92 downwardly, against the compression force of the spring 98, until the strap-contacting surface 110 is substantially coplaner with the peripheral strap-contacting surface 112 of the annular strap-engaging member 80. In this manner, this strap lengths U and L remain forced into face-to-face contact under pressure between the anvil 32 and strap-engaging surfaces 110 and 112. The anvil teeth 34 grip the top surface of the first strap U to hold it immobile. The teeth of the peripheral strap-contacting surface 112 grip the bottom surface of the lower strap length L so that the strap length L can move with the strap-contacting surface 112 and slide along, and relative to, the immobile upper strap length U.

In the preferred form of operation, the drive shaft 46 is continuously rotated, and the drive shaft 46 rotates even when the anvil 32 is in the fully elevated position (FIG. 4) before the strap lengths U and L are pressed against the strap-contacting surfaces 110 and 112. Because the strap-contacting surfaces 110 and 112 are defined on members for which the axis of rotation 58 is offset from the drive shaft rotational axis 48, the strap-contacting surfaces are moved in an orbit about the shaft axis 48. The orbital motion is, of course, defined by the offset distance X between the axis 58 and the drive shaft axis 48, and the maximum displacement is equal to twice the offset distance X.

When the strap lengths U and L are pressed together with the lower strap L engaged by the strap-contacting surfaces 110 and 112 as shown in FIG. 7, the gripped lower strap length L is subjected to orbital motion. The relative bodily sliding movement effected between the two strap lengths U and L by the motion of the strap length L causes in interface melting of a portion of the thickness of each strap length. The melted portions of the strap lengths merge.

Figure 9:
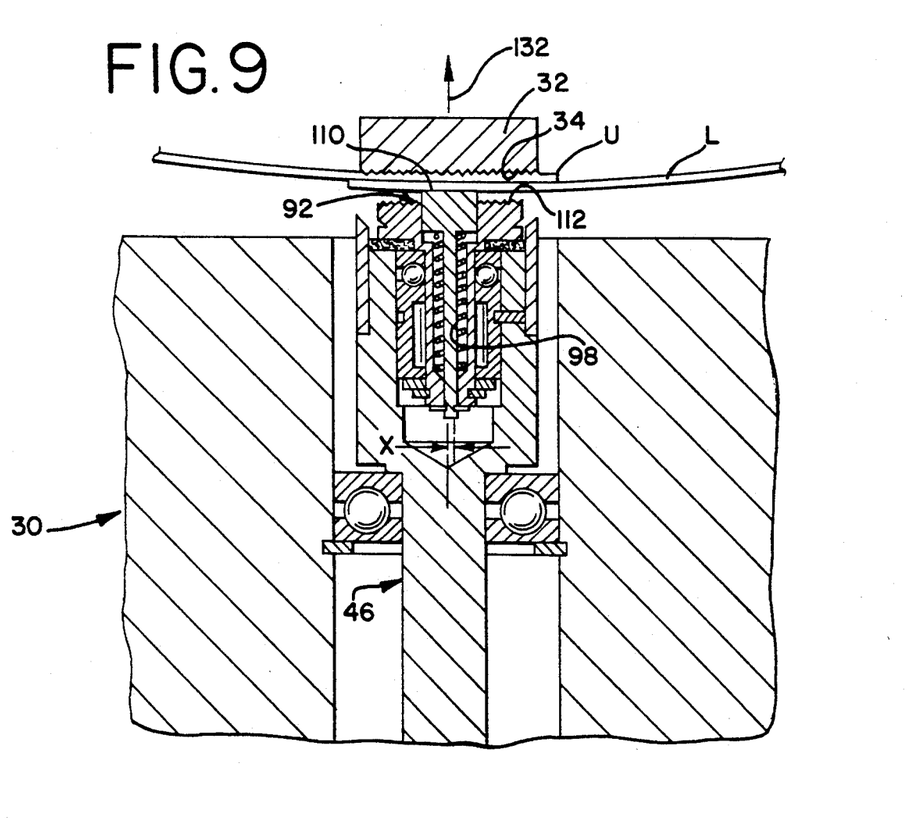

Next, while the drive shaft 46 continues to rotate and effect oscillation of the lower strap length L, and while the strap lengths remain molten at the interface, the anvil 32 is moved upwardly in the direction of the arrow 132 as illustrated in FIG. 9. The anvil 32 is moved upwardly to an intermediate position in which the anvil 32 and peripheral strap-contacting are sufficiently spaced apart to release the peripheral pressure on the strap lengths. However, the anvil 32 is maintained at a sufficiently low elevation so that the plunger 92 is biased outwardly by the spring 98 so as to maintain engagement of the central strap-contacting surface 110 with the bottom surface of the lower strap length L. This maintains pressure in a central region of the strap lengths.

The plunger 92 is still being moved in an orbit by the rotating drive shaft 46, but the plunger contacting surface 110, which is smooth, slides against the bottom surface of the lower strap length L. Thus, the lower strap length L, while subjected to the upwardly directed force of the plunger 92, remains fixed relative to the upper strap length U. Any frictional forces exerted by the smooth plunger 92 on the strap length L are not sufficient to overcome the viscous engagement of the melted portions of the strap lengths at the interface.

The force exerted by the plunger 92 on the strap lengths U and L is maintained for a predetermined period of time. The plunger 92 need not remain engaged until the melted strap portions completely resolidify and form the weld. However, the upward force of the plunger 92 against the straps in the central region of the weld does provide unique advantages under those conditions wherein a weld is to be formed with a plurality of encapsulated cavities. For example, when the strap is a polyester strap, such as the above-described Tenax B brand strap, a plurality of cavities or bubbles of vapor may be formed in the melted strap portions. In some situations excessive amounts of vapor may produce excessive bubbles in parts of a weld which could reduce the weld strength. However, it has been found that with the apparatus of the present invention, the plunger 92 subjects the central portion of the melted strap material to a continuing pressure, and this is believed to force cavities or bubbles radially outwardly to peripheral portions of the melted interface material. This tends to result in a generally annular distribution of bubbles around a central region which has few or no bubbles.

When a weld is thus produced with a plurality of such cavities, the weld configuration would appear substantially as diagrammatically illustrated in FIG. 1 wherein the weld central portion C contains substantially no cavities or bubbles 16 and wherein the peripheral regions P contain a concentration of such bubbles 16. The indentations 20 in the upper surface of the strap illustrated in FIG. 1 would typically result from engagement of the strap upper length U with the anvil teeth 34. It is believed that the number of bubbles in the peripheral region compared to the number of bubbles in the central region depends upon, among other things, the type of strap material, the pressures employed, and the length of time during which the plunger 92 is maintained against the straps while the peripheral strap-contacting surface 110 is disengaged from the straps.

Figure 10:
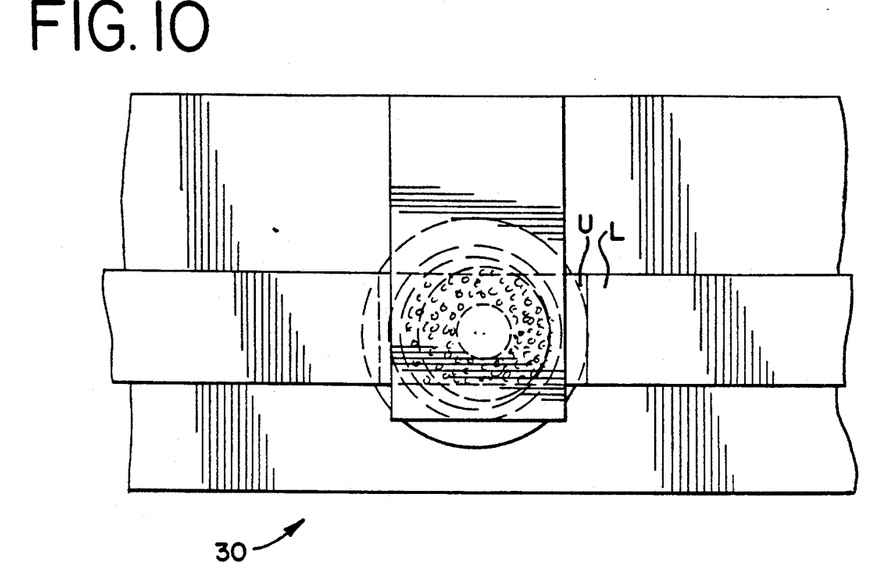
Figure 11:
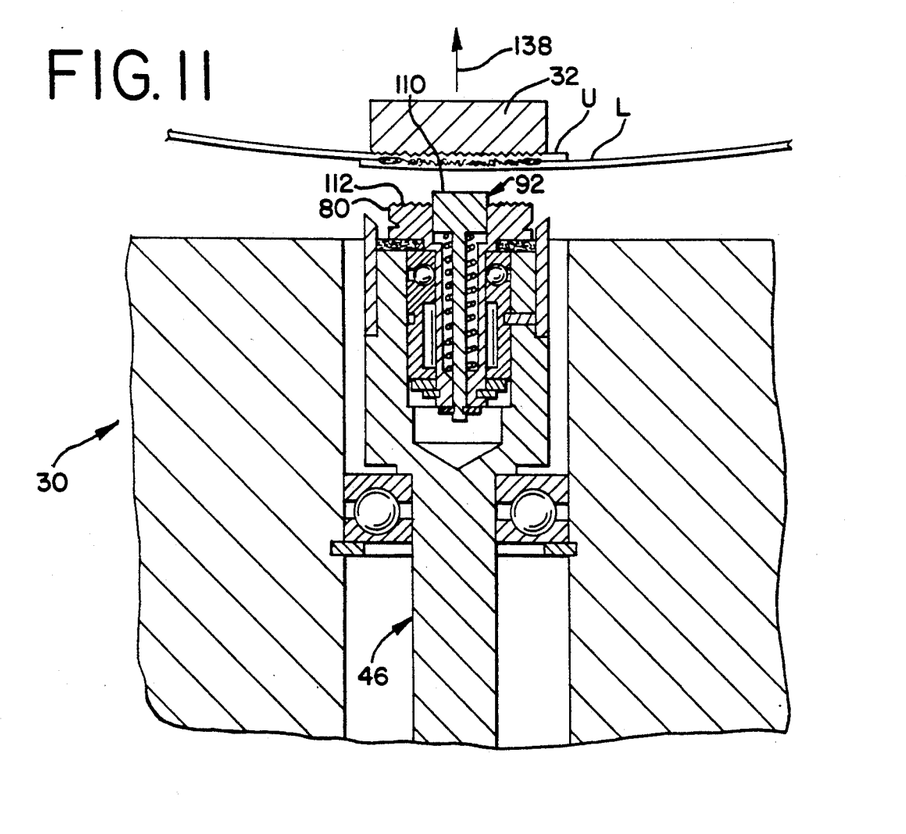

After a predetermined time period, the anvil 32 is moved further upwardly, to the initial, fully raised position as illustrated in FIGS. 10 and 11. The arrow 138 in FIG. 11 illustrates the direction of the further upward movement of the anvil 32. The pressure exerted on the central portion of the strap weld by the plunger 92 is thus terminated.

As the anvil 32 is moved upwardly to the fully elevated position, the overlapping straps U and L may remain disposed against the bottom surface of the anvil 32. This might occur if the upper strap length U stuck to the embedded teeth of the anvil 32.

The anvil 32 may be returned to the fully elevated position (FIG. 11) before the fused portions of the overlapping strap lengths have completely resolidified. Alternatively, the anvil 32 may be maintained in the intermediate position (FIG. 9) so as to maintain the central portion of the straps in the weld region under pressure until the fused portions of the strap material have substantially or completely resolidified throughout the entire weld region.

During the raising of the anvil 32 to the fully elevated position illustrated in FIG. 11, the drive shaft 46 may continue to rotate. Preferably, the drive shaft 46 rotates continually. This avoids having to start and stop the rotating mechanisms. This can reduce the wear on the machine and permit faster cycle operation because there will be no need to wait for the components to be brought up to the maximum design oscillation speed. Typically, the drive shaft rotation would be terminated only when the operator contemplates that there will be an extended period of time before the next strap portions are to be welded.

In a typical strapping machine application, where the strap is provided as a continuous length from a supply reel, the trailing portion of the strap (portion E in FIG. 1) would be severed, by appropriate mechanisms (not illustrated). The severing of the trailing portion of the strap may occur prior to, or after, the formation of the welded strap joint, depending upon the type of strapping machine design employed.

In one form of the invention as presently contemplated, the apparatus 30 may be operated to rotate the drive shaft at a speed of between about 16,000 revolutions per minute and about 20,000 revolutions per minute. The pressure exerted by the peripheral strap-contacting surface 112 is preferably between about 500 pounds per square inch and about 1,000 pounds per square inch. The pressure exerted by the central plunger strap-contacting surface 110 is between about 100 pounds per square inch and about 300 pounds per square inch. The peripheral contacting surface 112 is engaged with the lower strap length L for a period of time ranging between about 100 milliseconds and about 1,000 milliseconds. The plunger 92 is engaged with the lower strap length for a period of time ranging between about 50 milliseconds and about 300 milliseconds longer than the period of engagement of the peripheral contacting surface 112. The eccentric offset distance X is between about 0.5 mm. and about 0.8 mm.

Operation of the system within the above-listed parameters could be employed to provide welds in the above-described Tenax B brand strap having a width of about 11 mm. and a thickness of about 0.5 mm. For this strap, the diameter of the central plunger contact surface 110 may be about 7.9 mm., the inner diameter of the annular contacting surface 112 may be about 8 mm., and the outer diameter of the annular strap-contacting surface 112 may be about 15.7 mm. The tooth configuration of the strap-contacting surfaces 110 and 112 can be as described above.

Of course, the above-listed operating parameters (e.g., speed, pressure, etc.) are applicable to one form of the invention as an example. The parameters may be changed depending upon, among other things, the specific desired characteristics of the joint weld, the strap composition, the strap size, the sizes of the strap-contacting surfaces of the apparatus, etc.

The preferred embodiment of the apparatus illustrated in FIGS. 2-11 is highly effective in providing an efficient, quiet, and substantially smokeless process for making a welded joint between two overlapping lengths of thermoplastic strap. The process may be generally characterized as including a first step of forcing the strap lengths in face-to-face contact at above-ambient pressure along an interface in a central region (region C in FIG. 1) and in an adjacent peripheral region (region P in FIG. 1). Next, the temperature of the strap lengths is increased along the interface sufficient to melt at least part of the thickness of each strap portion at the interface. Finally, the above-ambient pressure is released first in the peripheral region and then subsequently in the central region. During this process, after the temperature has been raised an amount sufficient to melt the strap thicknesses at the interface, the strap portions are allowed to cool. The melted parts of the strap lengths along the interface then solidify to form a welded joint. The cooling may be initiated, and may even be completed, prior to releasing the pressure in the peripheral region.

Although the above-described process is advantageously effective with the preferred embodiment of the apparatus 30 described above with reference to FIGS. 2-11, other suitable apparatus which do not employ a friction-fusion process could be used. For example, a central plunger member and a peripheral member similar to the plunger 92 and peripheral member 80, respectively, may be provided in a non-rotating or non-orbiting system. Suitable means, such as an electric-resistance heated blade could be employed to initially contact the facing surfaces of the overlapping strap lengths to melt a portion of the thickness of each strap length. Then, the heated blade could be withdrawn, and the strap portions could be pressed together between the anvil on one side and the central plunger and peripheral member on the other side. Subsequently, the peripheral member could be retracted (or the anvil elevated) to leave only the central plunger engaged so as to continue to apply pressure to the central region of the strap weld area. Finally, the anvil and central plunger would be separated sufficiently to terminate the application of pressure and permit access to the formed strap weld.

Such a process could be employed with a strap material, such as polyester, which has a tendency to release vapor to form cavities or bubbles in the weld. However, such a process could also be employed with other types of strap material which have little or no tendency to produce encapsulated cavities or bubbles in a strap joint.

It will be appreciated that the novel apparatus of the present invention can be embodied in a design that can be relatively easily assembled and that has operational advantages.

Further, with certain types of strap, a strap weld with improved strength characteristics can be provided. Also, the process of the present invention facilitates the production of high quality welds in a consistent and repeatable manner.

It will be readily apparent from the foregoing detailed description of the invention and from the illustrations thereof that numerous variations and modifications may be effected without departing from the true spirit and scope of the novel concepts or principles of this invention.

What is claimed is:

1. Apparatus for making a welded joint between first and second overlapping lengths of flexible, thermoplastic strap, said apparatus comprising:

a frame;

an anvil supported on said frame for movement to a position in which it can be engaged by said first overlapping length of strap;

a drive shaft mounted for rotation in said frame about an axis and a cylindrical drive cavity defined in said drive shaft with the cavity axis being parallel to, but offset radially from, the drive shaft axis;

a peripheral strap-engaging member having a cylindrical driven shaft rotatably mounted in said drive shaft cavity and having an annular strap-contacting surface engageable with said second overlapping length of strap; a central strap-engaging member carried by said peripheral strap-engaging member and being engageable with said second overlapping length of strap within said annular strap-contacting surface of said peripheral strap-engaging member;

a resilient means carried by said peripheral strap-engaging member for biasing said central strap-engaging member relative to said peripheral strap-engaging member toward said anvil from a fully depressed position to fully extended position;

positioning means on said frame for moving said anvil to (1) a first position in which said anvil can be engaged by said first overlapping length of strap and in which both said central and peripheral strap engaging members engage said second overlapping length of strap to force said lengths of strap into face-to-face contact under pressure, (2) a second position in which said anvil and said peripheral strap-engaging member are sufficiently spaced apart to release the pressure of said peripheral strap-engaging member on said lengths of strap while still maintaining the pressure of said central strap engaging member on said lengths of strap, and (3) a third position in which said anvil and said central strap-engaging member are sufficiently spaced a part to release the pressure of said central strap-engaging member on said lengths of strap; and means for increasing the temperature of the contacting faces of the overlapping strap lengths to melt at least part of the thickness of each said strap including rotating means for rotating said drive shaft about said shaft axis in the first position of said anvil whereby both of said central and peripheral strap-engaging members are oscillated in a generally circular orbit about said shaft axis causing relative generally circular orbital slidable frictional movement between said contacting faces of said overlapping strap lengths.

2. Apparatus for making a welded joint between first and second overlapping lengths of flexible, thermoplastic strap, said apparatus comprising:

an anvil for engaging said first overlapping length of strap;

a central strap-engaging member for engaging said second overlapping length of strap;

a peripheral strap-engaging member for engaging said second overlapping length of strap around said central strap-engaging member;

pressing means for effecting relative movement between said anvil on one hand and each of said strap-engaging members on the other hand to (1) a first position in which said anvil engages said first overlapping length of strap and both said central and peripheral strap-engaging members engage said second overlapping length of strap to force said lengths of strap into face-to-face contact under pressure, (2) a second position in which said anvil and said peripheral strap-engaging member are sufficiently spaced apart to release the pressure of said peripheral strap-engaging member on said lengths of strap while still maintaining the pressure of said central strap engaging member on said lengths of strap, and (3) a third position in which said anvil and said central strap-engaging member are sufficiently spaced apart to release the pressure of said central strap-engaging member on said lengths of strap; and means for increasing the temperature of the contacting faces of said strap lengths to melt at least part of the thickness of each said strap length.

3. The apparatus in accordance with claim 2 in which said pressing means includes (a) resilient means for biasing said central strap-engaging member relative to said peripheral strap-engaging member toward said anvil from a fully depressed position to a fully extended position, and (b) positioning means for
(1) moving said anvil in a first direction to squeeze said overlapping lengths of strap against both said central and peripheral strap-engaging members at said first position,
(2) moving said anvil in a second direction opposite said first direction to said second position in which said central strap-engaging member remains biased in engagement with said second overlapping length of strap and said peripheral strap-engaging member is disengaged from said second overlapping length of strap, and
(3) moving said anvil further in said second direction to said third position to release the pressure on said overlapping lengths of strap between said anvil and said central strap-engaging member.

4. The apparatus in accordance with claim 2 in which said peripheral strap-engaging member is toothed for gripping said second overlapping length of strap.

5. The apparatus in accordance with claim 2 in which said anvil has a toothed, strap-contacting surface and said central strap-engaging member has a generally circular, smooth, strap-contacting surface to accommodate slipping relative to the face of said second overlapping length of strap.

6. The apparatus in accordance with claim 2 in which said means for increasing the temperature includes an oscillating means for effecting a relative closed path oscillating movement between said anvil on the one hand and both of said strap-engaging members on the other hand to effect relative bodily sliding movement between said strap lengths.

7. The apparatus in accordance with claim 6 in which said central strap-engaging member is carried by said peripheral strap-engaging member;
said apparatus includes a frame;
said oscillating means includes a drive shaft mounted for rotation about an axis in said frame and a cylindrical drive cavity defined in said drive shaft with the cavity axis being parallel to, but offset radially from, the drive shaft axis; and
said peripheral strap-engaging member includes a cylindrical driven shaft rotatably mounted in said drive shaft cavity.

8. The apparatus in accordance with claim 7 in which said peripheral strap-engaging member defines a bore surrounded by an annular, toothed, strap-contacting surface;
said central strap-engaging member is slidable disposed in said recess for movement between a fully depressed position and a fully extended position; and
said pressing means includes
(a) a compression spring mounted in said bore and engaged on one end with said peripheral strap-engaging member and on the other end with said central strap-engaging member to bias said central strap-engaging member toward said fully extended position, and
(b) positioning means for
(1) moving said anvil in a first direction to squeeze said overlapping lengths of strap against both said central and peripheral strap-engaging members at said first position,
(2) moving said anvil in a second direction opposite said first direction to said second position in which said central strap-engaging member remains biased in engagement with said second overlapping length of strap and said peripheral strap-engaging member is disengaged from said second overlapping length of strap, and
(3) moving said anvil further in said second direction to said third position to release the pressure on said overlapping lengths of strap between said anvil and said central strap-engaging member.

9. Apparatus for making a welded joint between first and second overlapping lengths of thermoplastic strap, said apparatus method comprising:

pressing means for forcing said strap lengths into face-to-face contact at above-ambient pressure along an interface in a central region and in an adjacent peripheral region;

means for increasing the temperature of said strap lengths along said interface sufficiently to melt at least part of the thickness of each strap portion at said interface; and means for releasing said above-ambient pressure first in said peripheral region and subsequently in said central region whereby said melted parts of said strap lengths along said interface solidify to form said welded joint.

10. The apparatus in accordance with claim 9 in which said means for increasing the temperature includes means for effecting relative bodily sliding movement between said strap lengths whereby at least part of the thickness of each said strap length melts along said interface in said central and peripheral regions.

11. The apparatus in accordance with claim 9 in which said apparatus includes an anvil, a peripheral strap-engaging member with an annular strap-contacting surface, and a central strap-engaging member with a central, circular, strap-contacting surface disposed within said annular strap-contacting surface.

* * * * *